July 12, 1932.  H. A. NEVILLE  1,867,325

PROCESS OF REMOVING CARBON MONOXIDE FROM EXHAUST GASES

Filed Nov. 18, 1929

INVENTOR
H. A. Neville
BY
Evans + McCoy
ATTORNEYS.

Patented July 12, 1932

1,867,325

UNITED STATES PATENT OFFICE

HARVEY A. NEVILLE, OF BETHLEHEM, PENNSYLVANIA, ASSIGNOR TO EVAN J. McILRAITH, OF CHICAGO, ILLINOIS

PROCESS OF REMOVING CARBON MONOXIDE FROM EXHAUST GASES

Application filed November 18, 1929. Serial No. 407,882.

This invention relates to methods of treating the exhaust gases of internal combustion engines, particularly to rid them of the poisonous carbon monoxide, which is always present due to the incomplete combustion of the hydrocarbon fuel.

An object of this invention is to provide a method of successfully removing substantially all the carbon monoxide by converting it into carbon dioxide, which is relatively harmless.

Another object of this invention is to provide a method for causing the oxidation of carbon monoxide without causing oxidation of the other oxidizable components of the exhaust gases such as the unburned hydrocarbons by means of the same reagent, since the exidation of such constituents would produce undesirable high temperatures, which might constitute a hazard to the automotive vehicle.

A further object of this invention is to provide a suitable catalyst to cause reaction between the water vapor and carbon monoxide present in the exhaust gases to cause oxidation of the carbon monoxide without the addition of any other oxidizing agent.

A further object is to provide a simple mechanical arrangement, whereby the gases pass into contact with the catalyst and whereby the catalyst may be readily renewed.

While it has been proposed before to remove carbon monoxide from exhaust gases, the seriousness of the problem, due to the relatively great increase in the number of automobiles in use and concentrations in traffic, is now being appreciated more than ever. Poisonous gases are not only a menace to the operators of automobiles, but to the workers in buildings along the streets where traffic is congested and in public garages.

The hazard of poisoning from carbon monoxide can be appreciated from the fact that an investigation made by the Bureau of Mines on 23 types of automobiles showed that the average content of carbon monoxide in the exhaust gases from cars moving at 15 miles per hour on the level is 6.3%. At higher speeds and on grades the percentage of carbon monoxide increases. It is considered that exposure to concentrations as low as 6 parts of carbon monoxide in 10,000 (or 0.06%) would be injurious. Carbon monoxide is the only toxic constituent of exhaust gas.

Furthermore, the effect of constant inhalation of carbon monoxide, even in very low concentrations, is cumulative, as it combines chemically with the hæmoglobin of the blood thus reducing the quantity of oxygen which can be carried by the blood. This decreases the resistance of the individual to infection and makes him particularly susceptible to pulmonary diseases.

Furthermore, in the building of vehicular tunnels, which are now being proposed in many of the large cities for the relief of traffic congestion, the question of ventilation is a very large factor in the cost of the tunnel. The principal difficulty in providing adequate ventilation in such cases is due to the high concentration of carbon monoxide which is produced by the automotive vehicles passing through the tunnels, and with the increasing traffic density from year to year the problem becomes constantly more serious.

The exhaust gases from an internal combustion engine as they come from the engine contain water vapor which arises primarily from the burning of the hydrocarbons of the fuel, and to a small extent from the water vapor included in the air taken into the engine. Since the hydrocarbons of the fuel have a general formula of $C_nH_{2n+2}$ upon oxidation of the hydrocarbon fuel in the engine there will always be in the exhaust gases a content of water vapor which is at least equal to the sum of the CO and $CO_2$ content. In my process I take advantage of this fact that the quantity of water vapor present is always more than sufficient to oxidize the CO present to $CO_2$.

Averages of analyses of exhaust gases under variable conditions show that the quantity of free oxygen present in the exhaust gas is insufficient to oxidize the carbon monoxide to carbon dioxide, for it is present only to the extent of about 1% or 2%, whereas the carbon monoxide is present somewhat in excess of 6%.

According to my invention I have found that I can oxidize the carbon monoxide gas by using the water vapor present in the exhaust gas and at the temperatures which naturally obtain in the exhaust gas shortly after it enters the exhaust passages. In this manner I avoid the oxidation of the other combustible constituents of the exhaust gas, such as hydrogen and hydrocarbons, since water vapor is incapable of reacting with these substances under conditions existing in my apparatus.

In order to avoid the generation of a relatively large amount of heat I have discovered a reaction whereby substantially only the CO present in the exhaust gas is oxidized, it being as aforesaid the principal toxic constituent of that gas, and only a relatively small amount of heat is evolved.

The reaction which I utilize for oxidizing the carbon monoxide is

$$CO + H_2O \rightleftharpoons CO_2 + H_2 + 9,700$$

calories. This reaction is ordinarily very slow except when the gases are confined in a container at relatively high temperatures. Under these high temperature conditions the above reaction, which is reversible, has a tendency to go toward the production of carbon monoxide and water vapor, and this is the condition that obtains in the combustion chambers of the internal combustion engine itself.

By the use, however, of a suitable catalytic agent the reaction can be promoted to effect the oxidation of carbon monoxide and the production of $CO_2$ and hydrogen, and this can be carried out at relatively low temperatures, such as temperatures between 200° C. and 500° C.

By carrying out this reaction at these relatively low temperatures and substantially completely oxidizing the CO by this process without the oxidation of the other oxidizable constituents of the exhaust gases, it is possible to effect this oxidation in a relatively simple and efficient manner, and with means which are perfectly practicable and can be readily applied to an automotive vehicle.

Referring to the chemical equilibrium, $$CO + H_2O \rightleftharpoons CO_2 + H_2 + 9,700 \text{ calories},$$

it is apparent that, since the reaction is exothermic in the direction of the production of carbon dioxide and hydrogen, the conversion of carbon monoxide to carbon dioxide by means of this reaction will be favored by low temperatures. Higher temperatures tend to shift the equilibrium in the direction in which heat is absorbed, in this case toward the production of carbon monoxide, and this, as already stated, is the condition in the combustion chambers.

When the exhaust gases cool normally after entering the exhaust passages, the thermodynamic tendency is to cause a shift of the equilibrium toward the right (in the above equation) resulting in the conversion of carbon monoxide into carbon dioxide. This shift in equilibrium, however, does not occur to an appreciable extent since the rate of this reaction is quite slow and since this rate decreases quite rapidly as the temperature is lowered.

This shift in the equilibrium can, however, be effected by bringing the somewhat cooled gases into intimate contact with an active catalyst which can accelerate the rate of the reaction between water vapor and carbon monoxide. A catalyst, of course, can only aid in bringing about equilibrium conditions and cannot carry any reaction beyond such a condition.

The equilibrium constants at different temperatures have been experimentally determined for this reaction by various investigators and are recorded in the chemical literature. From these constants and the partial pressures of water vapor, carbon monoxide, carbon dioxide and hydrogen present in exhaust gas it can be calculated that the quantity of carbon monoxide in equilibrium with the other gases at the temperatures I propose to use (namely, 200° C. to 500° C.) would be practically insignificant.

Since it is desirable to keep the temperature of the exhaust gas relatively low while it is in contact with the catalyst, reactions of an highly exothermic nature must be avoided. High temperatures are also to be avoided because of the accompanying hazard to the motor vehicle. By oxidizing the carbon monoxide by means of water vapor I am able to keep the temperature relatively low since the quantity of heat produced is relatively small as compared with the heat value of the oxidation of carbon monoxide by means of oxygen or air. This is shown by the equations:

(A) $CO + H_2O \rightarrow CO_2 + H_2 + 9,700$ calories.
(B) $CO + \frac{1}{2}O_2 \rightarrow CO_2 + 68,000$ calories.

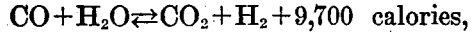

Furthermore, as carbon monoxide is apparently the only constituent of exhaust gas which can react with water vapor, substantially no heat is evolved in this process other than that produced by the oxidation of carbon monoxide. When oxygen or air is used as the oxidizing agent the other combustible components of exhaust gas are also oxidized producing great quantities of heat. Such a situation would become particularly serious if there was a considerable quantity of unburned fuel vapor in the exhaust gas. Such condition would occur if the carburetor were improperly adjusted or if the ignition in one or more combustion chambers was faulty.

The use of water vapor and a catalyst to remove carbon monoxide from water gas or from other gases consisting principally of hydrogen is well known. The purpose in such case is to purify the hydrogen for industrial uses. In such practice temperatures of about 450° C. to 500° C. are used.

It has been possible in practice to reduce the carbon monoxide content of industrial hydrogen by this means at best to about one percent. The conditions in exhaust gas, however, are favorable for the more complete removal of carbon monoxide. This will be seen from a consideration of the equation.

$$CO + H_2O \rightleftharpoons CO_2 + H_2 + 9,700 \text{ calories.}$$

In the process for the purification of hydrogen the large percentage of hydrogen initially present in the gas tends to prevent the complete conversion of carbon monoxide to carbon dioxide since a high partial pressure of hydrogen favors the reaction from right to left as written above. In exhaust gases from motors burning hydrocarbon fuels the percentage of hydrogen is inappreciable and hence it is possible by means of water vapor and a suitable catalytic agent to reduce the percentage of carbon monoxide in exhaust gases to a considerably greater extent than in the purification of hydrogen at the same temperature.

In general, the catalysts which are effective in promoting the reaction between carbon monoxide and water vapor may also act to a certain extent as catalysts for the oxidation of carbon monoxide and hydrogen by means of free oxygen or air. Since there is always a small percentage of free oxygen in exhaust gas the conversion of carbon monoxide to carbon dioxide by this means may occur to a limited extent. Likewise, the free oxygen in exhaust gas may be consumed to some extent in the oxidation of the small percentage of hydrogen which may be present in the exhaust gas initially or the hydrogen which is produced in the reaction $CO + H_2O \rightarrow CO_2 + H_2$. This oxidation of hydrogen to water vapor, if it occurs, will favor the more complete conversion of carbon monoxide to carbon dioxide since it both increases the partial pressure of water vapor and reduces the partial pressure of the hydrogen, both of which effects favor the reaction $CO + H_2O \rightarrow CO_2 + H_2$, in the direction indicated, or decrease the equilibrium concentration of CO.

Experiments which I have performed have shown that the oxygen content of exhaust gas does decrease when the exhaust gas is passed over the catalyst in order to bring about the reaction $CO + H_2O \rightarrow CO_2 + H_2$. This decrease in the oxygen content is most probably due to its consumption in the oxidation of hydrogen and carbon monoxide. The high thermal value of such oxidations has already been mentioned but the percentages of free oxygen and hydrogen in exhaust gas are too small to constitute any considerable hazard. This danger arises only when additional air is continuously drawn into the exhaust stream or oxygen is supplied by some other means. An example of typical analyses of exhaust gas before and after passage over the catalytic agent will illustrate the reduction in the quantity of oxygen and the reduction in the quantity of carbon monoxide by my method:

| Exhaust gas from motor (dry basis) | Exhaust gas after passing through chamber containing catalyst, at 225° C. (dry basis) |
|---|---|
| $CO_2$ _____ 8.5% | $CO_2$ _____ 18.3% |
| $CO$ _____ 6.0% | $CO$ _____ 0.0% |
| $O_2$ _____ 1.0% | $O_2$ _____ 0.2% |

From these analyses it is clear that while a portion of the oxygen was consumed, the quantity consumed was insufficient to account for the oxidation of the carbon monoxide. It may also be true that part of the oxygen consumed was used in oxidizing some of the other combustible gases present. These results indicate that the conversion of the carbon monoxide to carbon dioxide by my process must be primarily due to the reaction $CO + H_2O \rightleftharpoons CO_2 + H_2$.

The operating temperatures of 200° C. are specified because I have found that the exhaust gas in the passage from the motor attains a temperature of about 200° C. within 15 seconds after the motor is started and that the temperature does no ordinarily exceed 500° C. even when the motor vehicle is driven at maximum speed and up steep grades. Furthermore, I have found that the catalyst is substantially 100% effective at 200° C. and exhibits practically complete efficiency up to temperatures in excess of 500° C. Below 200° C. the catalyst is active in promoting the reaction, but with the given conditions cannot provide complete conversion of the carbon monoxide. However, some activity results within a very few seconds after the motor starts and grows more nearly complete as the temperature rises until it reaches 200° C., where substantially complete conversion results.

A suitable catalyst for carrying out this reaction between carbon monoxide and water vapor is a mixture of iron oxide, chromium oxide and cerium oxide, the iron oxide being greatly predominant. An example of such a catalyst is one made from 195 parts ferric nitrate, 4 parts ammonium bichromate and 1 part cerium nitrate. This mixture is heated and evaporated until the nitrates are decomposed leaving a mixture of the oxides of these metals.

It will be obvious to a person skilled in the art that other metallic oxides may be substituted for the above mentioned combinations. For example, oxides of the metals of the iron group with the addition of one or more other metallic oxides, such as thorium, aluminum, potassium and manganese may be used.

The catalyst may be used in granular form when prepared as above described, or it may be prepared with the addition of granular pumice, sand or any other suitable support of inert material, which may be granular or in the form of a screen or porous mass such as asbestos fibre. The catalyst should be made with such physical form that it has considerable inherent strength and will not pulverize readily and thus be lost. Therefore, it may be preferable to have the catalyst carried by suitable strong support or inert material. It is desired to have the catalytic agent in such form and the containers of such cross section that the exhaust gases may readily pass through them without creating a sufficient back pressure to decrease the efficiency of the internal combustion engine. Enough of this material should be exposed to bring the gases into intimate contact with the catalytic material before they completely pass through the catalytic chamber. It is obvious that my invention may be applied to the exhaust gases of any type of internal combustion engine. For purposes of illustration, however, a construction which is readily applicable to automotive vehicles is shown, and which, if desired, can replace the muffler now in common use.

Figure 1:
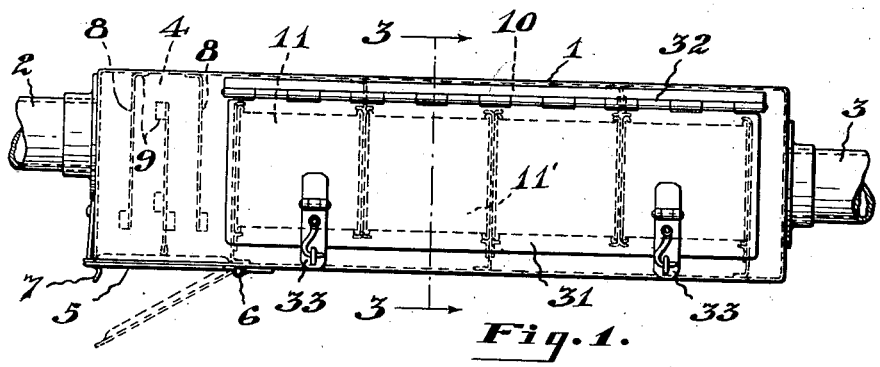
Figure 1 is a side elevation of the apparatus.

The apparatus for the elimination of the carbon monoxide consists of a casing 1, which is provided with an inlet pipe 2 and a discharge pipe 3. The inlet pipe 2 leads into a baffle chamber 4 which is provided with a suitable door 5 hinged thereto at 6. The door may be secured in closed position by any suitable means, such as latch 7. In the baffle chamber 4 are suitable baffle plates 8 which are secured by flanges 9 to the walls and top by spot welding or otherwise. The arrangement of the baffles 8 is such that the gases are caused to follow a tortuous path and will deposit particles of liquid or solid matter, such as oil, water, carbon, etc., in the baffle chamber. The door 5 provides a convenient means of access for cleaning this compartment. It also provides a safety door in case of an explosion of the unburned gases in the manifold or baffle chambers, such as sometimes results from faulty burning of the fuel in one or more cylinders.

In the catalytic chamber 10 are provided suitable cartridges 11, 11' containing catalytic material 12. A vertical plate 13 is suitably supported by flange 14 attached to the bottom of the chamber and by flange 15 which is secured to the side of the chamber. The plate 13 is provided with inturned flanges 16 and 17 for a purpose to be hereinafter set forth. A vertical plate 18 is carried by the top of the chamber and extends downward, terminating in outturned flanges or lugs 19 and 20, and it is suitably secured to the chamber by end flange 21 and side flange 22. The plate 18 is provided with angle members having outwardly extending flanges 23 and 24. The plate 25 is a vertical plate similar to plate 13, and is secured to the bottom of the chamber by means of flange 26 and side flange 27, and extends upward. It is provided with flanges 28 and 29 and terminates in outturned lugs or flanges 30. The cartridge chamber 10 is provided with a suitable door 31, preferably hinged at 32 to the side of the chamber, and having suitable latches 33 for securing it in closed position. When the door 31 is open it will be seen that the cartridge 11 may be slipped horizontally between the runners 16 and 17 carried by the plate 13 and runners 19 and 23 carried by the plate 18. The cartridge 11' may be slipped between the runners 20 and 24 carried by the plate 18 and runners 28 and 30 carried by the plate 25.

The cartridges 11, 11' may be of any suitable construction, and are shown, for example, as having side walls 34 and end walls 35, the tops and bottoms of the side and end walls being folded over to hold the porous screens 36 between which is held the catalytic material 12.

Figure 2:
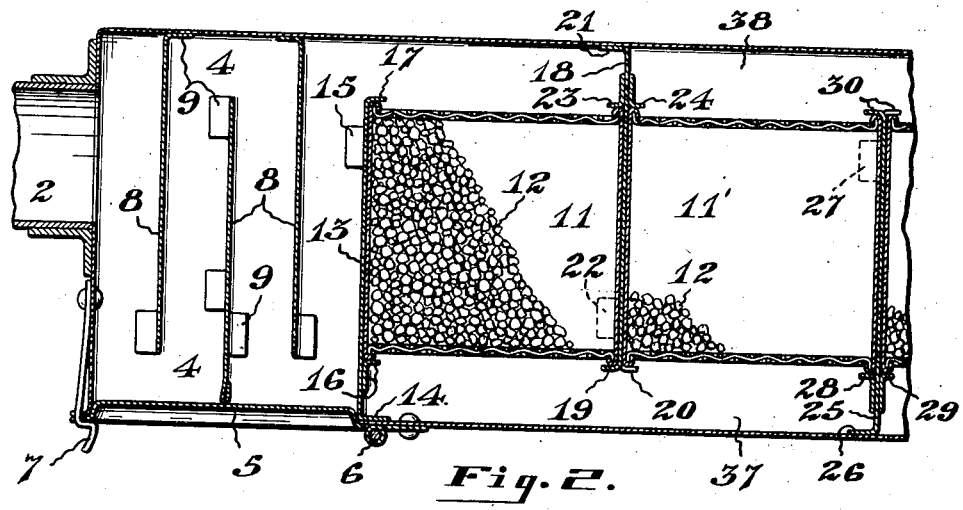
Figure 2 is an enlarged vertical section of a portion of the apparatus shown in Fig. 1.
Figures 3, 4:
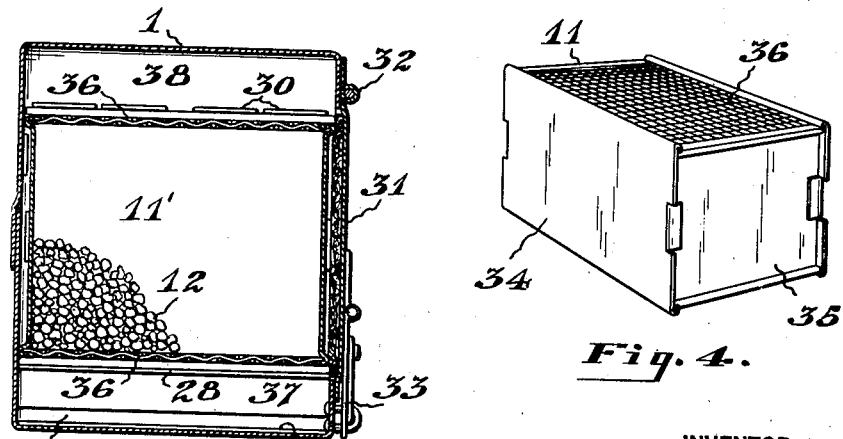
Figure 3 is a vertical section on line 3—3 of Fig. 1.
Figure 4 is a perspective view of a catalyst cartridge.

In the construction shown in Fig. 2 it will be seen that the gases, as they come from the baffle chamber, will pass downwardly through the cartridge 11 into the space 37 below the cartridges and upwardly through the cartridge 11' to the space 38 above the cartridges, and will pass on through the catalytic chamber in a similar manner until the gases pass through all the cartridges that are provided in the catalytic chamber. The number of cartridges in the catalytic chamber may be varied, depending upon the size of the cartridge and the volume of gas to be passed through the cartridges in order that the carbon monoxide may be oxidized.

It will thus be seen that in my apparatus I have provided a convenient method of supplying catalyst to the catalytic chamber in the form of cartridges which can be readily removed and replaced upon the exhaustion or depletion of the catalytic material in the cartridge. This catalyst material is not acted upon chemically by the reaction between the carbon monoxide and the vapor or with the free oxygen, but may be worn to some extent by the mechanical vibration of the container due to the movement of the automobile. In order to determine whether the catalytic material is removing substantially all of the carbon monoxide in the exhaust gases, the gas coming from the exhaust pipe 3 after passing through the catalytic material may be readily tested to detect the presence of carbon monoxide. If any carbon monoxide is present, new catalytic cartridges may be readily substituted.

I have shown the above apparatus by way of example, and it will be understood that any suitable apparatus may be employed to carry out my invention by which the catalyst may be readily renewed and replaced, in order to effect the complete removal of the carbon monoxide from the exhaust gases.

It will be seen that by the use of my invention the injurious carbon monoxide gas can be selectively removed from the exhaust gases discharged by an internal combustion engine using hydrocarbons as fuel, and this is accomplished by using a catalyst which promotes the reaction of carbon monoxide with the water vapor which is always present in the exhaust gases in more than sufficient amount to oxidize the carbon monoxide. It will also be seen that the carbon monoxide can thus be removed with the liberation of a minimum amount of heat, and that under the conditions of reaction according to my invention the heat evolved is not sufficient to favor reaction expressed in equation A toward the left, and that I can also accomplish the removal of the carbon monoxide at temperatures between 200° C. and 500° C., which are not sufficiently high to be impractical.

It will be seen that my apparatus may be used either in conjunction with the usual muffler on an automotive vehicle, or may be used as a substitute for it, as I have found that the cartridge chamber and the catalytic chamber may be so arranged as to produce a muffling action and there is no necessity for using an additional muffler.

Furthermore, it is to be understood that the particular compounds disclosed, and the procedure set forth, are presented for purposes of explanation and illustration, and that various equivalents can be used and modifications of said procedure can be made without departing from my invention as defined in the appended claims.

What I claim is:

1. The process of oxidizing carbon monoxide in exhaust gases from internal combustion engines, which comprises passing the hot gases into intimate contact with a suitable catalyst under conditions of partial pressure of carbon monoxide and water vapor existing in exhaust gases to cause substantially the complete oxidation of carbon monoxide to carbon dioxide in accordance with the equilibrium equation:

$$CO + H_2O \rightleftarrows CO_2 + H_2$$

at temperatures of from about 200° C. to about 500° C.

2. The process of removing carbon monoxide from exhaust gases discharged by internal combustion engines, which comprises bringing the hot gases into intimate contact with a plurality of metallic oxides as catalysts at temperatures of about 200° C. to about 500° C., whereby the reaction, $$CO + H_2O \rightarrow CO_2 + H_2$$

does occur and at least the major proportion of the carbon monoxide is oxidized in accordance with such a reaction, and the reaction, $$CO_2 + H_2 \rightarrow CO + H_2O$$

does not occur to any practicable extent.

3. The process of oxidizing carbon monoxide in exhaust gases from internal combustion motors which comprises passing the hot gases through a reaction chamber containing a catalytic agent which is capable of promoting the reaction between carbon monoxide and water vapor from the temperature attained in the exhaust passages of the motor within a few seconds after the motor is started, without causing the temperature to exceed about 500° C. during the operation of the motor, and catalytically oxidizing the carbon monoxide by means of water vapor in the presence of said agent.

4. The process of oxidizing carbon monoxide in exhaust gases from internal combustion motors which comprises passing the hot gases through a reaction chamber containing a catalytic agent which is capable of promoting the reaction between carbon monoxide and water vapor to a considerable extent at temperatures as low as 200° to 300° C., and catalytically oxidizing the carbon monoxide by means of water vapor in the presence of said agent.

5. The process of oxidizing carbon monoxide in exhaust gases of internal combustion engines containing water vapor and carbon monoxide, which comprises passing the hot gases through a reaction chamber containing a catalytic agent which is capable of promoting or accelerating a reaction between the carbon monoxide and water vapor at a temperature of less than 500° C., and from a temperature normally occurring in said exhaust gases within a few seconds after the engine is started, said reaction chamber being substantially free from oxygen or other oxidizing agents which react with carbon monoxide more readily than does water vapor.

6. The process of oxidizing carbon monoxide in exhaust gases containing water vapor and carbon monoxide, which comprises passing the hot gases through a reaction chamber containing a catalytic agent, which is capable of promoting or accelerating a reaction between the carbon monoxide and water vapor in accordance with the equation $$CO + H_2O \rightarrow CO_2 + H_2,$$

said catalytic agent being incapable of oxidizing the carbon monoxide by direct action to a sufficient extent to prevent the above reaction from taking place, said chamber being substantially free from oxygen or other oxidizing agents which react with carbon monoxide more readily than water vapor does at temperatures of less than 500° C.

7. The process of oxidizing carbon monoxide in exhaust gases containing water vapor and carbon monoxide, which comprises passing the hot gases through a reaction chamber containing a catalytic agent which is capable of effecting a reaction between the carbon monoxide and the water vapor, in accordance with the equation $$CO + H_2O \rightarrow CO_2 + H_2,$$

said catalytic agent being of such a composition that it will not react more than incidentally with the carbon monoxide, and the amount of extraneous oxygen or other oxidizing agents in said reaction chamber being insufficient in amount to effect by their incidental reaction with the carbon monoxide, an increase of the temperature of the exhaust gases to more than 500° C.

8. The process of oxidizing carbon monoxide in exhaust gases by means of water vapor which is also present in such gases, which comprises passing the hot gases through a reaction chamber containing a catalytic agent comprising a major proportion of an intimate mixture of an oxide of the iron group and an additional oxide, said catalytic agent being effective in causing the reaction between the carbon monoxide and water vapor to take place as the exhaust gases pass through the reaction chamber, and said reaction chamber being substantially free from air or oxidizing agents which will prevent the oxidation of at least the major proportion of the carbon monoxide by means of water vapor from taking place.

9. The process of oxidizing carbon monoxide in exhaust gases from internal combustion engines, which comprises passing the hot gases through a reaction chamber containing a catalytic agent comprising a predominant amount of a member of the iron group and a small proportion of one or more additional oxides selected from a group consisting of thorium, aluminum, potassium, cerium, manganese and chromium oxides and catalytically oxidizing the carbon monoxide by the water vapor at temperatures normally occurring in the exhaust passages of the engine within a few seconds after the motor is started and at temperatures occurring in the exhaust gases while the motor is being operated without causing the temperature of the exhaust gases to exceed 500° C., said catalytic agent being capable of selectively oxidizing the carbon monoxide by means of water vapor.

In testimony whereof I affix my signature.

HARVEY A. NEVILLE.